United States Patent [19]
Youngquist et al.

[11] Patent Number: 5,979,239
[45] Date of Patent: Nov. 9, 1999

[54] ULTRASONIC IMAGING SYSTEM

[75] Inventors: Robert C Youngquist, Cocoa, Fla.; J. Steven Moerk, Taylorsville, N.C.

[73] Assignee: The United States of America as represented by the Administrator of the National Aeronautics and Space Administration, Washington, D.C.

[21] Appl. No.: 08/845,900

[22] Filed: Apr. 28, 1997

[51] Int. Cl.⁶ .............................. G01H 13/00; G01M 3/24
[52] U.S. Cl. .......................... 73/584; 73/592; 73/40.5 A
[58] Field of Search ................................. 73/40.5 A, 584, 73/585, 587, 592; 367/118, 129, 140, 178, 191

[56] References Cited

U.S. PATENT DOCUMENTS

| | | | |
|---|---|---|---|
| 3,308,424 | 3/1967 | Simpkins et al. | 73/40.5 A |
| 3,996,552 | 12/1976 | Wolber | 313/369 |
| 4,287,581 | 9/1981 | Neale, Sr. | 367/135 |
| 4,414,482 | 11/1983 | Lewis et al. | 310/334 |
| 4,433,398 | 2/1984 | Kodera et al. | 367/177 |
| 4,455,863 | 6/1984 | Huebler et al. | 73/40.5 |
| 4,670,683 | 6/1987 | 't Hoen | 310/334 |
| 4,987,769 | 1/1991 | Peacock et al. | 73/49.7 |
| 5,101,774 | 4/1992 | Marziale et al. | 122/504.2 |
| 5,161,408 | 11/1992 | McRae et al. | 73/40.7 |
| 5,231,866 | 8/1993 | Peacock | 73/40.5 |
| 5,263,004 | 11/1993 | Larson, III | 367/7 |
| 5,349,262 | 9/1994 | Grenon et al. | 310/334 |
| 5,416,724 | 5/1995 | Savic | 73/40.5 A |
| 5,433,104 | 7/1995 | Kunze et al. | 73/40.5 |
| 5,557,969 | 9/1996 | Jordan | 73/40.5 A |
| 5,710,377 | 1/1998 | Youngquist et al. | 73/583 |

FOREIGN PATENT DOCUMENTS 442415  11/1974  U.S.S.R. .............................. 73/40.5 A

*Primary Examiner*—Hezron Williams
*Assistant Examiner*—Helen C. Kwok
*Attorney, Agent, or Firm*—Beth A. Vroni; Gary G. Borda

[57] ABSTRACT

An imaging system is described which can be used to either passively search for sources of ultrasonics or as an active phase imaging system, which can image fires, gas leaks, or air temperature gradients. This system uses an array of ultrasonic receivers coupled to an ultrasound collector or lens to provide an electronic image of the ultrasound intensity in a selected angular region of space. A system is described which includes a video camera to provide a visual reference to a region being examined for ultrasonic signals.

22 Claims, 5 Drawing Sheets

ULTRASONIC IMAGING SYSTEM

ORIGIN OF THE INVENTION invention described herein was made in the performance of work under a NASA contract and is subject to the provisions of Public Law 96-517 (35 USC 202) in which the contractor has elected not to retain title.

TECHNICAL FIELD OF THE INVENTION

The present invention relates generally to ultrasonic signal detection and in particular the present invention relates to an ultrasonic imaging system for use in applications such as ultrasonic leak detection.

BACKGROUND OF THE INVENTION

Systems used to store and transport high pressure gases are susceptible to containment leaks. These leaks can be both dangerous and difficult to detect. Detection of small leaks in high pressure pipes and storage devices is compounded when the leak site is in an area which is difficult to access, such as a complicated network of pipes. For example, a high pressure hydrogen leak experienced by the National Aeronautics and Space Administration (NASA) grounded a space shuttle flight. To identify the leak location, ultrasonic leak detection equipment was placed on a pan and tilt stage within the space shuttle aft compartment to allow remotely operated leak searches. This system assisted in leak detection, but did not provide a system for imaging a region where an ultrasonic leak is located.

The size of leaks which need to be detected can be described in SCIMs (standard cubic inches per meter), but are best described as a function of the contained pressure and the leak orifice size. A small orifice combined with a sufficiently high pressure creates a jet-like leak. These jet-type leaks create turbulent pressure variations that can be detected with an ultrasonic transducer. Turbulence in air creates detectable sound in the 40 kHz range, and air coupled ultrasonic transducers can detect this frequency of noise given off by leaks. Hand-held leak locating devices having air coupled ultrasonic transducers can be used to detect leaks. For example, a hand-held leak detector is described in U.S. patent application Ser. No. 08/540,616, entitled "Ultrasonic Leak Detection System", filed on Oct. 17, 1995, incorporated herein by reference. While such systems provide a useful means for detecting ultrasonic leaks, they lack the ability to provide an image of a region containing a leak.

For the reasons stated above, and for other reasons stated below which will become apparent to those skilled in the art upon reading and understanding the present specification, there is a need in the art for an ultrasonic detection system which produces an ultrasonic image of a region of space so that an ultrasonic leak source can be found from its location in the ultrasonic image.

SUMMARY OF THE INVENTION

The above mentioned problems with detecting ultra sonic leaks and other problems are addressed by the present invention and which will be understood by reading and studying the following specification. An ultrasonic imaging system is described which produces an ultrasonic image of a region of space.

In particular, the present invention describes an ultrasonic imaging system comprising an ultrasonic signal collector for focussing ultrasonic signals received from a region, an array of ultrasonic transducers located in an aligned position with the ultrasonic signal collector to detect the received ultrasonic signals and provide output signals, and a display unit for displaying the output signals to provide an image of the region containing the ultrasonic signals.

In another embodiment, an ultrasonic leak detection system is described which comprises an ultrasonic signal collector for focussing received ultrasonic signals. The ultrasonic signal collector is configured as a parabolic reflector having a focal region. The system also comprises an array of ultrasonic transducers positioned in the focal region of the ultrasonic signal collector to detect the received ultrasonic signals and provide a plurality of output signals, and signal processing circuitry for processing the plurality of output signals to be displayed on a display unit to provide an visual representation of the received signals.

A method of detecting ultrasonic signals is described. The method comprises the steps of focussing ultrasonic signals from a region of space onto a plurality of ultrasonic transducers, amplifying and multiplexing an analog output signal from each of the ultrasonic transducers. The analog output signal from each of the ultrasonic transducers is converted into a digital signal, and displayed to provide an image of the focused ultrasonic signals.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Figure 1:
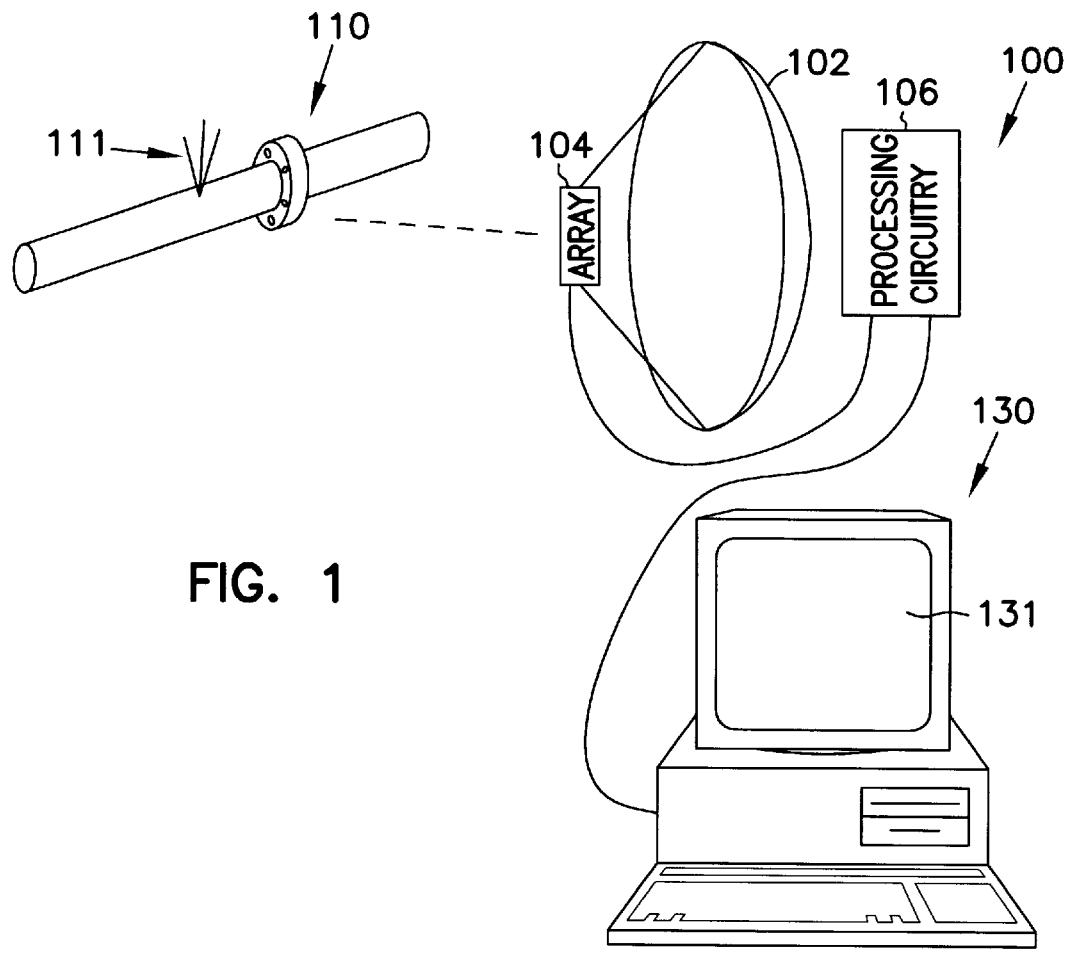
FIG. 1 is a diagram of an ultrasonic imaging system for detecting a leak.

Referring to FIG. 1, an ultrasonic imaging system 100 is described as follows. The imaging system includes an ultrasonic collector 102, a detector array 104, signal processing circuitry 106, and a display 130. The detector array 104 and processing circuitry 106 can be physically located in the location of the detector array. The imaging system is applicable for a variety of uses, but is particularly well suited for detection of leaks. As illustrated, a gas pipe 110 for transporting a high pressure gas substance has a small leak, identified in FIG. 1 as region 111. The imaging system 100 provides an image of the region of space containing the gas pipe based upon received ultrasonic signals. The region which contains the leak, therefore, can be more easily identified using the imaging system. This is particularly useful when the region of space is heavily populated by equipment such that the complexity and accessability of the area make typical leak location methods impractical.

In general, the ultrasonic collector 102 can be any ultrasonic signal collector, but is preferably a parabolic receiver which acts as an ultrasonic lens, or mirror. A prototype spherically cut lens, or reflector, was machined from a one inch thick, 12 inch by 12 inch, sheet of plexiglass. The lens, therefore, was configured as a reflective dish having a 12 inch diameter and a focal length of about one foot. Thus, an ultrasonic image of collected signals was focussed in a focal region about one foot in front of the parabolic reflector. It will be appreciated that other collector configurations may be used, and that the present invention is not limited to the described lens. For example, one skilled in the art may determine that a conical collector provides certain advantages.

An ultrasonic focal plane array 104 is located in front of the collector to convert the ultrasonic pressure variations into electronic signals which can be processed. The focal array is optimally located in an aligned position with the collector, and preferably within the focal region of the collector. The focal array can be positioned in and out along an axis of the collector to focus the imaging system on regions of space at various distances in front of the collector.

Figure 2:
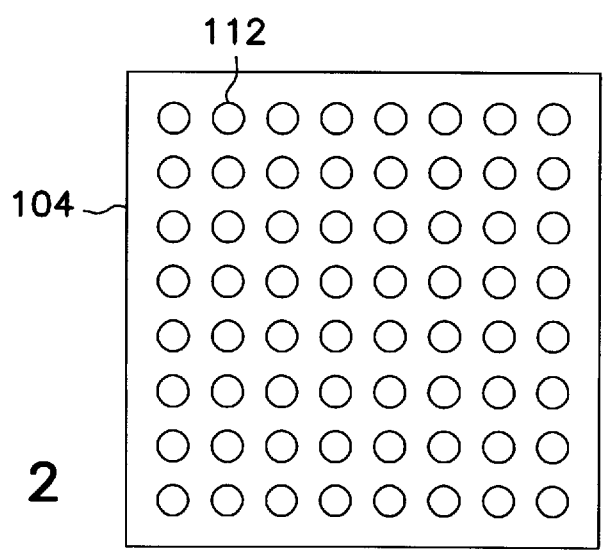
FIG. 2 is a more detailed illustration of a component of the imaging system of FIG. 1.

In one embodiment, the ultrasonic focal plane array comprises an 8 by 8 grid of 40 kHz air-coupled ultrasonic transducers 112, see FIG. 2. The transducers are spaced apart by about ⅝ inch to form a square focal plane array having outside dimensions of about 5 inches by 5 inches. The array, therefore, includes 64 transducers which are positioned to receive signals reflected from collector 102. The focal plane array is not limited to any specific design and can include different numbers of transducers and be configured in other geometric configurations, such as a circle.

Figure 3:
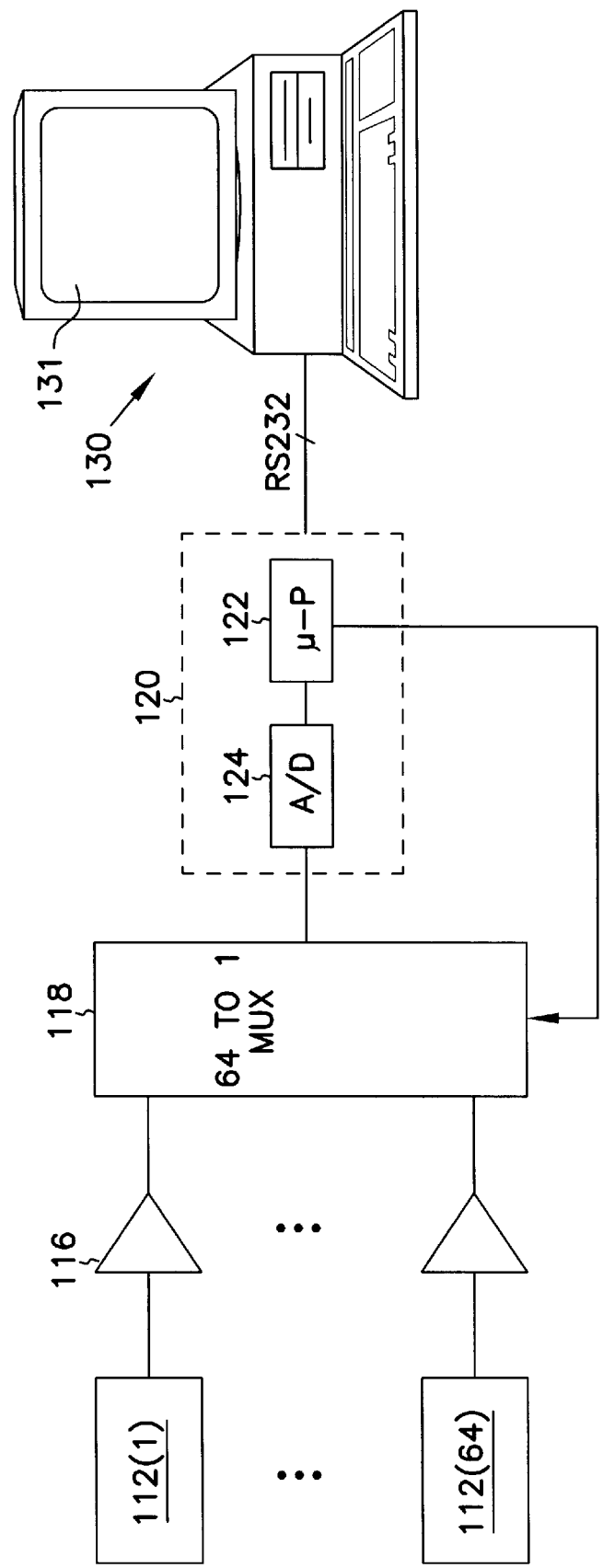
FIG. 3 is a block diagram of signal processing equipment of the imaging system of FIG. 1.

Signal processing circuitry 106 is provided to convert output signals from the transducers 112 into signals suitable for display. Referring to FIG. 3, the processing circuitry contains 64 pre-amplifier circuits 16 and a 64 to 1 multiplexing circuit 118. This circuitry converts the small output voltage signals from the 64 ultrasonic transducers 112 into a serial buffered data stream which is sent to sub-processing circuitry 120. The sub-processing circuitry contains a microprocessor 122 with its support circuitry. The microprocessor is used to control the multiplexor 118. Analog to digital converter 124 converts the analog transducer signals from the multiplexer output into digital signals. The microprocessor processes the digital signals and communicates the digital signals, via an RS-232 link, to a computer, or display unit 130. A standard computer is illustrated as display unit 130, but other known displays can be used. It will be appreciated that only one embodiment is illustrated for processing the output of the transducers, and that additional circuitry can be substituted for the pre-amplifier, mutiplexer, and microprocessor to transmit the transducer outputs to a visual display. Likewise, the RS-232 link can be replaced with other known communication links.

The computer 130 receives the digital serial transducer data from the sub-processing circuitry 120 and displays it on a monitor 131 providing a real-time two-dimensional image of the ultrasonic emission profile in a region of space defined by the field of view of the detector. In essence, the ultrasonic imaging system 100 is an ultrasonic camera. Each "pixel" of ultrasound intensity, which occupies many electronic pixels on the monitor, displays the time varying intensity of ultrasound emitted in the angular space defined by the detector and reflector combination.

The computer 130 executes a set of instructions, or software, which controls the display of the outputs of the 64 transducers in a preferred image. Using an 8 by 8 transducer array can provide a relatively course image. To smooth the block-like appearance of the raw 8 by 8 pixel image, pixel to pixel averaging can be carried out in order to yield a 15 by 15 ultrasonic pixel image on the computer monitor. The present invention is not limited to any particular software instructions executed by the computer. It is contemplated that those skilled in the art can vary the software to customize the display image according to user preferences.

Figure 4:
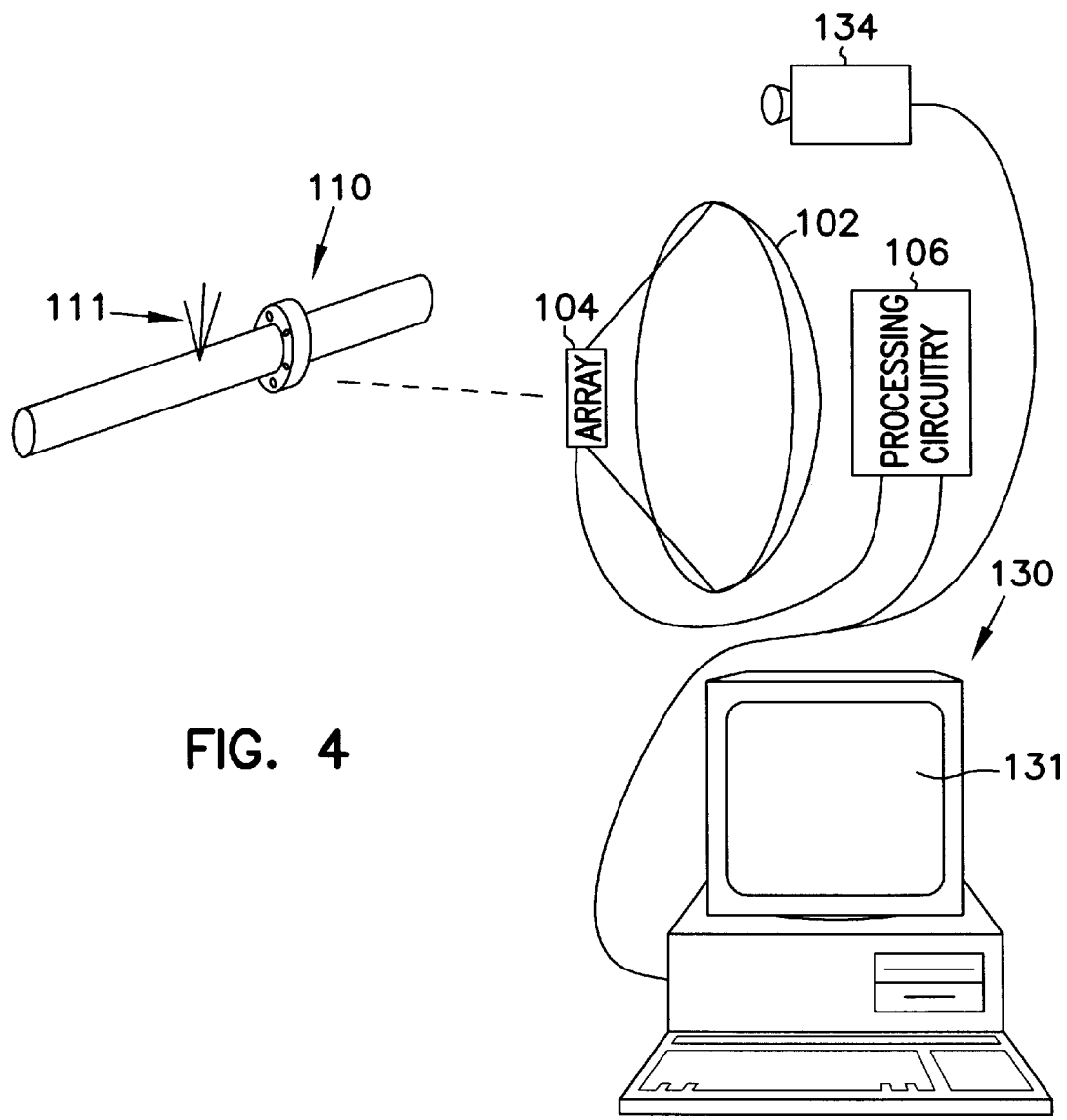
FIG. 4 is a diagram of an alternate ultrasonic imaging system.

An alternate embodiment of an ultrasonic imaging system is illustrated in FIG. 4. This system includes a video camera 134 located adjacent to the collector. The details and operation of the collector, focal array and processing circuitry as described above are equally applicable to this embodiment. The video camera captures a visible light image of the region of space viewed by the ultrasonic detector. The video image is processed and transmitted to the computer 130 for display on the monitor 131. As such, a user can see a more readily recognizable image of the region being examined. The video and ultrasonic images can then be superimposed on each other for enhanced viewing. In addition, an indicator, such as a red dot, can be displayed over the video image to pin-point the location of a detected ultrasonic source, or leak.

Figure 5:
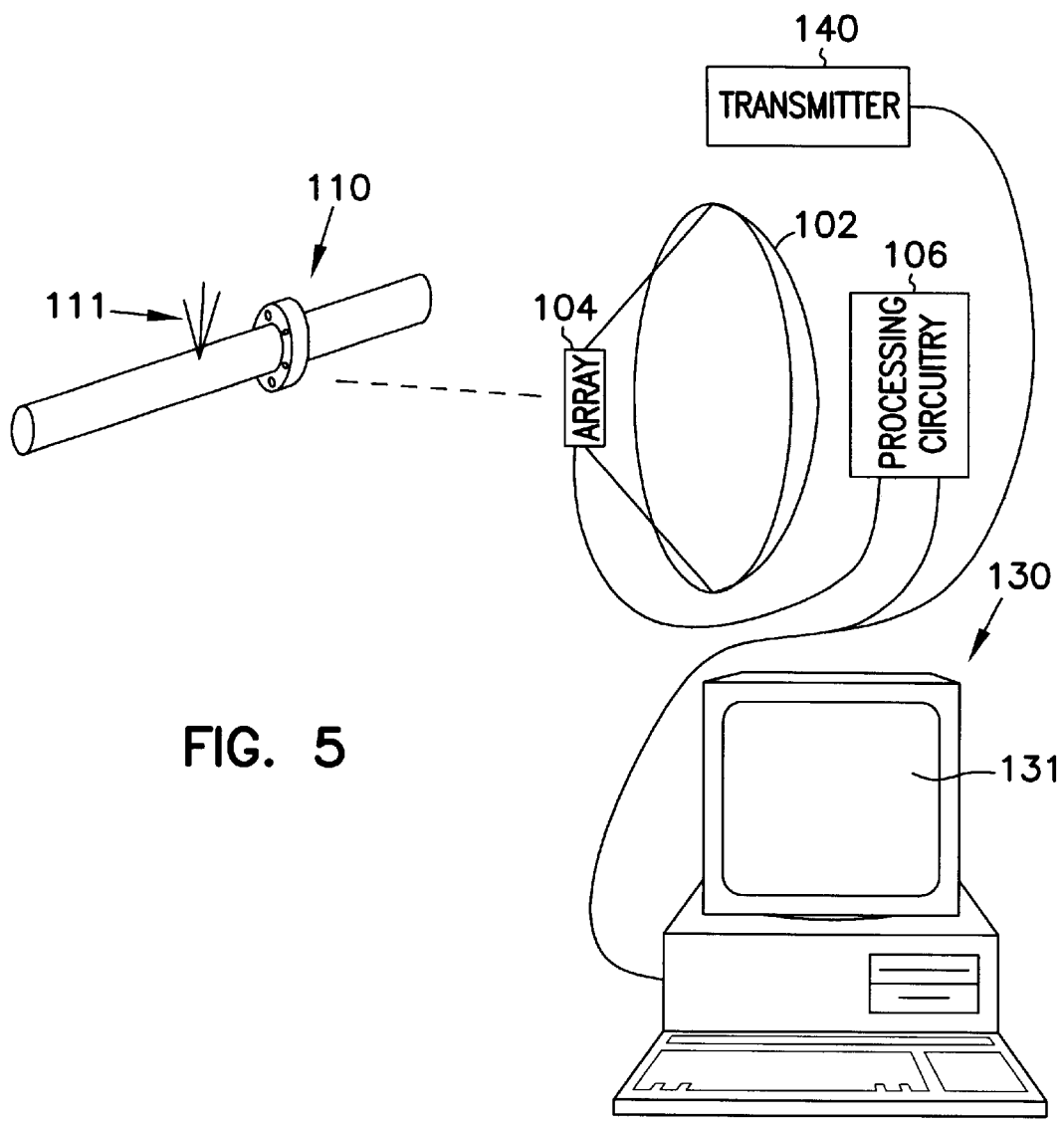
FIG. 5 is a diagram of yet another ultrasonic imaging system.

The above described detection systems are passive ultrasonic leak detection and location systems. As such they provide an image of an ultrasonic source, such as a leak. The above described imaging systems can be converted into active phase imaging systems, as illustrated in FIG. 5, by providing an ultrasonic source, or transmitter 140.

Because the computer 130 has access to both amplitude and phase of the ultrasonic signals from each transducer, an ultrasonic transmitter 140 can be used to illuminate an area of space. The transmitter 140 provides a source of ultrasonic signals which are reflected off of objects located in front of the transmitter. The reflected ultrasonic signals are collected as described above using ultrasonic collector 102, detector array 104, and signal processor 106. The phase of each of the returned signals is detected and captured by the microprocessor 122 for communication with the display/computer 130. A phase map, therefore, of the field of view of the imaging system can be provided for viewing. The phase map indicates the length of time it took for the ultrasonic signal to get to an object, bounce off that object and get back to the detector. If the distance between the object and the detector changes, the phase will change.

The computer is used to image changes in the phase of the return signals received at each transducer. The software executed by the computer is changed accordingly to create an image on the computer monitor that corresponded to the phase of the return signals as captured by the transducers. As such, a wide variety of physical phenomena, which alter the speed or transit of sound and hence the phase of the reflected sound wave can be imaged. These phenomena include gas leaks, invisible fires, and even temperature induced air currents. The system can also be used to detect moving objects, such as a person moving within the field of view of the system. It will be understood that the video camera of FIG. 4 can be combined with the transmitter of FIG. 5 to provide a comprehensive ultrasonic detection system.

Figure 6:
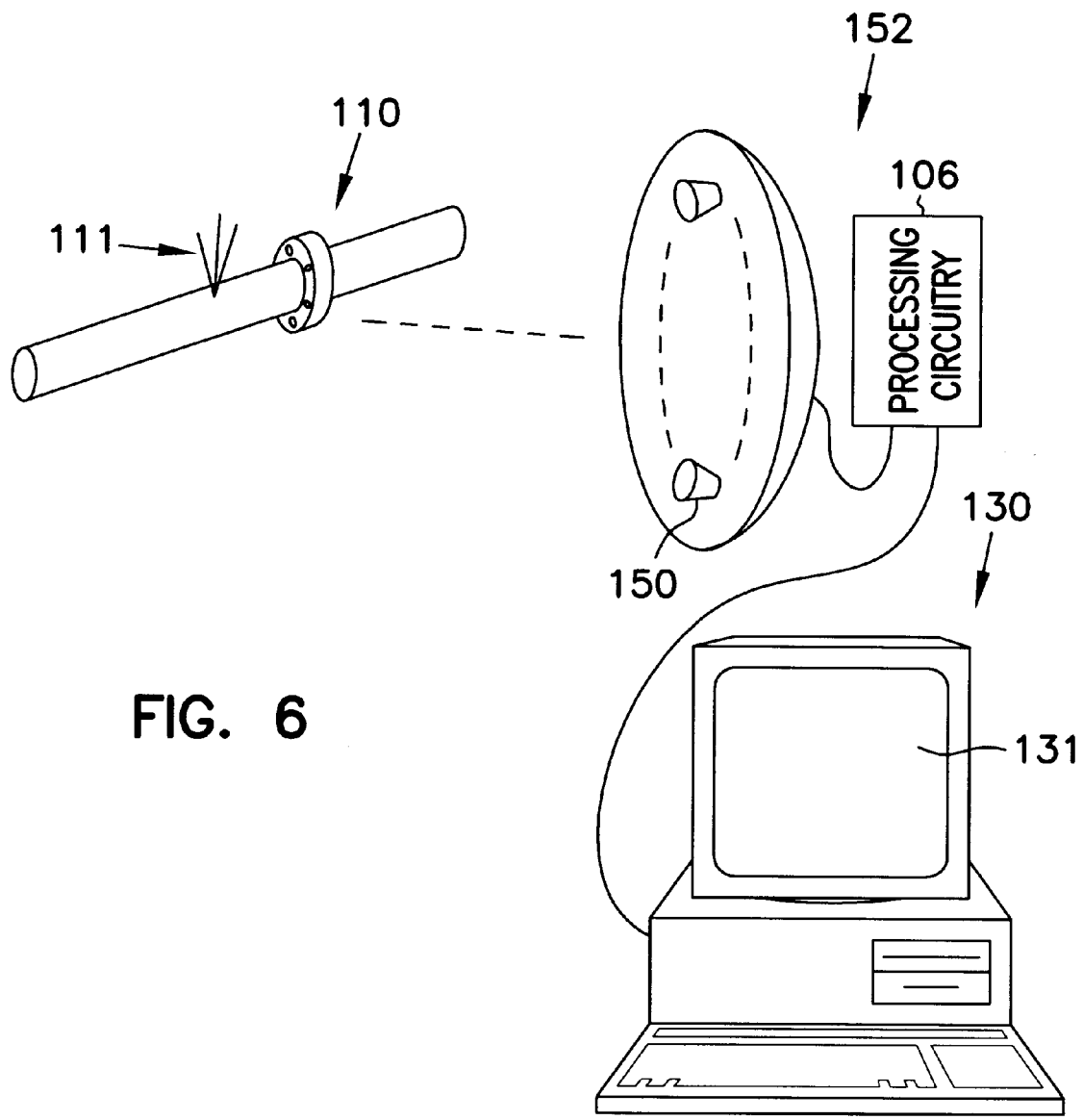
FIG. 6 illustrates an alternate ultrasonic collector.

One of the limitations of the above described ultrasonic imaging systems is a result of the significant wavelength of the ultrasound being detected. In air, a 40 kHz wave has a wavelength of about ⅓ inch. It is well known from diffraction theory that an angular limit of resolution of any wave based imaging system is 1.22 times the wavelength divided by the diameter of the collecting lens. The above systems, assuming a diameter of the reflecting parabola is 12 inches, has a minimum angular resolution of about 2 degrees. This limitation makes high resolution imaging difficult. To increase resolution, either the ultrasonic wavelength needs to be made smaller by going to a higher frequency (75 kHz is a possibility) or a larger diameter collecting lens (2 or even 3 feet may be appropriate in some settings). A one-half degree angular resolution, however, appears to be about the limit with the imaging systems described. For a fine, highly accurate imaging system, more transducer elements need to be added to the array. This requires that the field of view of the collector be increased. For example, if a large area with a substantial number of pipes and potential leak sites needed to be examined, a reflector having a size of about 10 feet by 10 feet may be required. Wide field of view ultrasonic imaging, however, is difficult with a reflecting parabolic dish because the array would become large compared to the size of the reflector and would block significant signals. An alternative collector 152, should a wide field of view system be desired, can be constructed by covering a surface with small collecting horns 150. These horns can be designed to have roughly a 4–5 degree field of view and could be aimed to cover a large angular region of space. An ultrasonic transducer would be located within each collecting horn 150, see FIG. 6 for an illustration of one embodiment where a curved surface is covered with small collecting horns 150. This would result in a much flatter profile image with the ability to cover virtually an unlimited area of space, but would decrease the system collection efficiency. See U.S. patent application Ser. No. 08/540,616, entitled "Ultrasonic Leak Detection System", filed on Oct. 17, 1995 for a description of a collecting horn. It will be recognized that the collecting horns can be placed on a flat surface and positioned in a tilted fashion to cover a large angular region of space.

Conclusion

An imaging system has been described which can be used to either passively search for sources of ultrasonics (i.e. an ultrasonic camera) or with modification, can be converted to a phase imaging system, which can image fires, gas leaks, or air temperature gradients. This system uses an array of ultrasonic receivers coupled to an ultrasound lens or mirror to provide an electronic image of the ultrasound intensity in a selected angular region of space. By adding an active transmitter to the above, and additional electronic and software processing, a system that images a variety of reflective and refractive features of the field of view is realized. A system has also been described which includes a video camera to provide a visual reference to a region being examined for ultrasonic signals.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An ultrasonic leak imaging system comprising:
   an ultrasonic signal collector lens for focussing ultrasonic signals received from a region;
   an array of ultrasonic transducers located in an aligned position with the ultrasonic signal collector lens to detect the received ultrasonic signals and provide output signals; and
   a display unit for displaying the output signals to provide an image of the region containing the ultrasonic signals.

2. The ultrasonic imaging system of claim 1 wherein the ultrasonic signal collector lens is a parabolic reflector having a focal region and the array of ultrasonic transducers is located in the focal region.

3. The ultrasonic imaging system of claim 1 wherein the array of ultrasonic transducers comprises a plurality of transducers arranged in substantially square grid.

4. The ultrasonic imaging system of claim 3 wherein the array of ultrasonic transducers comprises 64 transducers.

5. The ultrasonic imaging system of claim 1 wherein the display unit is a computer having a monitor, the computer being capable of executing a computer program to convert an output signal from each of the ultrasonic transducers in the array of ultrasonic transducers into a graphical representation to be displayed on the monitor.

6. The ultrasonic imaging system of claim 1 further comprising:
   an amplifier for amplifying an analog output signal from each of the ultrasonic transducers in the array of ultrasonic transducers.

7. The ultrasonic imaging system of claim 1 further comprising:
   an analog to digital conversion circuit for converting an analog output signal from each of the ultrasonic transducers in the array of ultrasonic transducers.

8. The ultrasonic imaging system of claim 1 further comprising:
   a switching circuit coupled to the array of ultrasonic transducers for switching an output signal from each of the ultrasonic transducers in the array of ultrasonic transducers to the display unit.

9. The ultrasonic imaging system of claim 1 further comprising:
   a video camera positioned adjacent to the ultrasonic signal collector, the video camera capturing a light image of a field of view of the ultrasonic signal collector.

10. The ultrasonic imaging system of claim 1 further comprising:
    an ultrasonic transmitter positioned adjacent to the ultrasonic signal collector lens for transmitting ultrasonic signals at a remote object such that reflected ultrasonic signals are collected by the ultrasonic signal collector.

11. The ultrasonic imaging system of claim 1 further comprising:
    a video camera positioned adjacent to the ultrasonic signal collector lens, the video camera capturing a light image of a field of view of the ultrasonic signal collector; and
    an ultrasonic transmitter positioned adjacent to the ultrasonic signal collector lens for transmitting ultrasonic signals at a remote object such that reflected ultrasonic signals are collected by the ultrasonic signal collector.

12. An ultrasonic leak detection system comprising:
    an ultrasonic signal collector lens for focussing received ultrasonic signals, the ultrasonic signal collector lens is configured as a parabolic reflector having a focal region;
    an array of ultrasonic transducers positioned in the focal region of the ultrasonic signal collector lens to detect the received ultrasonic signals and provide a plurality of output signals; and signal processing circuitry for processing the plurality of output signals to be displayed on a display unit to provide a visual representation of the received signals.

13. The ultrasonic detection system of claim 12 wherein the display unit comprises:

a computer and a monitor, the computer being capable of executing a computer program to convert an output signal from each of the ultrasonic transducers in the array or ultrasonic transducers into a visual representation of the received signals to be displayed on the monitor.

14. The ultrasonic leak detection of claim 12 further comprising:

an amplifier for amplifying an analog output signal from each of the ultrasonic transducers in the array of ultrasonic transducers;

an analog to digital conversion circuit for converting the analog output signal from each of the ultrasonic transducers in the array of ultrasonic transducers; and a switching circuit coupled to the array of ultrasonic transducers for switching output signal from each of the ultrasonic transducers in the array of ultrasonic transducers to the display unit.

15. The ultrasonic leak detection system of claim 12 further comprising:

a video camera positioned adjacent to the ultrasonic signal collector lens, the video camera capturing a light image of an ultrasonic field of view of the ultrasonic signal collector lens.

16. The ultrasonic leak detection system of 12 further comprising:

an ultrasonic transmitter positioned adjacent to the ultrasonic signal collector lens for transmitting ultrasonic signals at a remote object such that a reflected ultra sonic signals are collected by the ultrasonic signal collector lens.

17. The ultrasonic leak detection system of claim 12 further comprising:

a video camera positioned adjacent to the ultrasonic signal collector lens, the video camera capturing a light image of an ultrasonic field of view of the ultrasonic signal collector lens; and an ultrasonic transmitter positioned adjacent to the ultrasonic signal collector lens for transmitting ultrasonic signals at a remote object such that a reflected ultra sonic signals are collected by the ultrasonic signal collector lens.

18. A method of detecting ultrasonic leak signals, the method comprising the steps of:

focussing ultrasonic signals from a region of space onto a plurality of ultrasonic transducers using a collector lens;

amplifying an analog output signal from each of the ultrasonic transducers;

multiplexing the output signal from each of the ultrasonic transducers;

converting the analog output signal from each of the ultrasonic transducers into a digital output signal; and displaying the digital output signal from each of the ultrasonic transducers to provide an image of the focused ultrasonic signals.

19. The method of claim 18 wherein the step of focussing ultrasonic signals comprises reflecting the ultrasonic signals off of a parabolic reflector.

20. The method of claim 18 wherein the digital output signal from each of the ultrasonic transducers is displayed using a computer and a monitor, the computer being capable of executing a computer program to convert an output signal from each of the ultrasonic transducers into a visual representation of the signals to be displayed on the monitor.

21. The method of claim 18 further comprising the steps of:

capturing a video image of the region of space; and displaying the video image with the displayed digital output signals to provide a visual reference for detected ultrasonic signals.

22. The method of claim 18 further comprising the step of transmitting ultrasonic signals from an ultrasonic transmitter, and the step of focussing ultrasonic signals comprises collecting ultrasonic signals are reflected off of an object.

* * * * *